United States Patent [19]

Vettori et al.

[11] Patent Number: 4,549,858
[45] Date of Patent: Oct. 29, 1985

[54] FLAT TYPE FAN, PARTICULARLY FOR ELECTRONIC CIRCUITS

[75] Inventors: Claude Vettori, Le Kremlin Bicetre; Henri Chauviere, Courbevoie, both of France

[73] Assignee: Etudes Techniques et Representations Industrielles E.T.R.I., Neuilly sur Seine, France

[21] Appl. No.: 727,606

[22] Filed: Apr. 26, 1985

Related U.S. Application Data

[63] Continuation of Ser. No. 363,432, Mar. 30, 1982.

[30] Foreign Application Priority Data

Apr. 3, 1981 [FR] France ............ 81 06711

[51] Int. Cl.⁴ ............................ F04B 35/04
[52] U.S. Cl. ........................ 417/353; 417/423 R
[58] Field of Search ........... 417/353, 352, 354, 360, 417/361, 423 R, 355, 410

[56] References Cited

U.S. PATENT DOCUMENTS

| | | | |
|---|---|---|---|
| 1,205,016 | 11/1916 | Ramsey | 417/355 |
| 2,950,859 | 8/1960 | Kirk | 417/353 |
| 3,293,463 | 12/1966 | Church . | |
| 3,303,995 | 9/1964 | Boechel | 414/353 |
| 3,644,066 | 2/1972 | Heob et al. | 417/354 |
| 3,700,358 | 10/1972 | Papst et al. | 417/354 |
| 3,914,071 | 10/1975 | Friese | 417/353 |
| 4,164,690 | 8/1979 | Müller et al. | 417/410 |

FOREIGN PATENT DOCUMENTS

| | | | |
|---|---|---|---|
| 449067 | 6/1948 | Canada | 417/354 |
| 857096 | 11/1952 | Fed. Rep. of Germany . | |
| 2257509 | 6/1974 | Fed. Rep. of Germany . | |
| 2325473 | 12/1974 | Fed. Rep. of Germany | 417/354 |
| 1371399 | of 0000 | France . | |
| 2325220 | 4/1977 | France . | |
| 2371591 | 6/1978 | France . | |
| 2470879 | 6/1981 | France . | |
| 55-144751 | 4/1979 | Japan . | |

Primary Examiner—Cornelius J. Husar
Assistant Examiner—Peter M. Cuomo
Attorney, Agent, or Firm—Young & Thompson

[57] ABSTRACT

A flat type fan is provided having an axial dimension very much less than its radial dimension, comprising a casing forming a cylindrical duct for a fan blade unit.

Two webs carry bosses having fixing bores therethrough. The length of the bosses is equal to the length of the casing, which allows the fan to be fixed on a wall by any one of its faces, for blowing or for suction.

9 Claims, 15 Drawing Figures

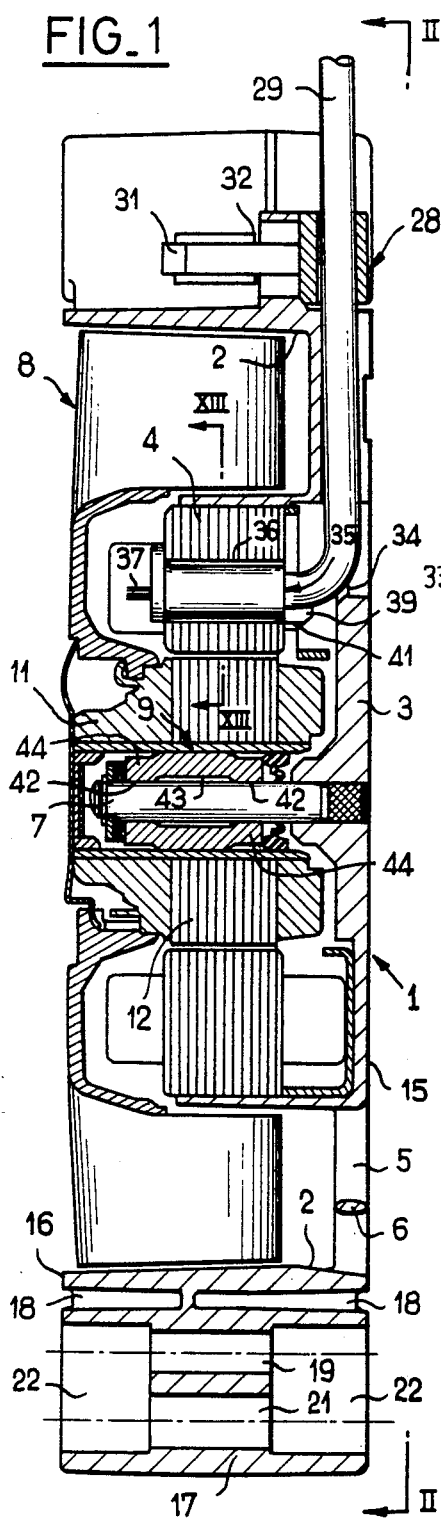
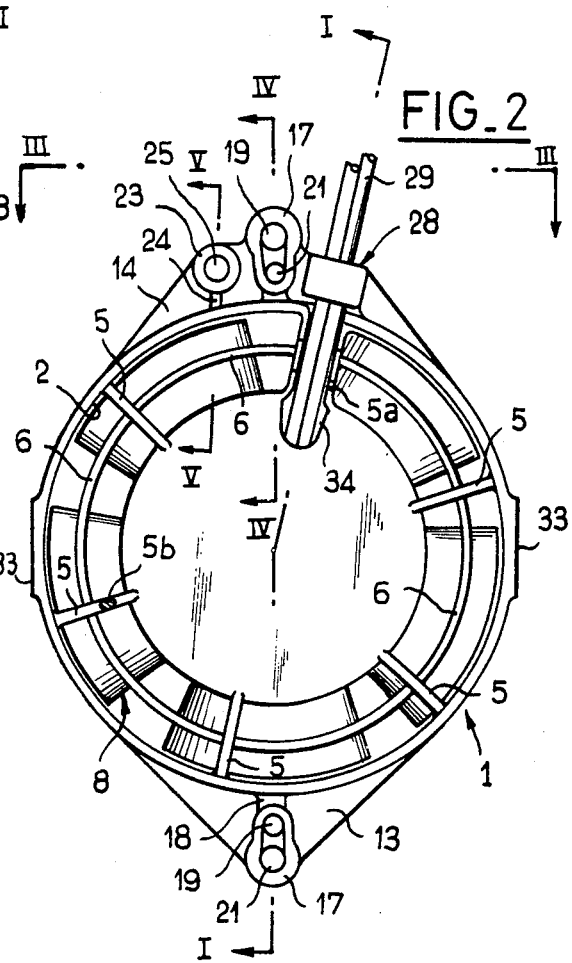
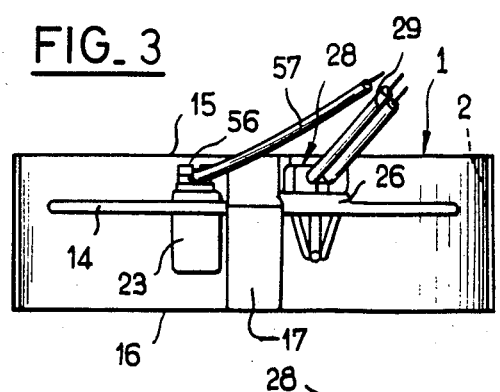
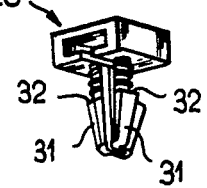

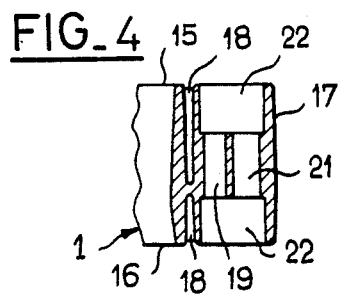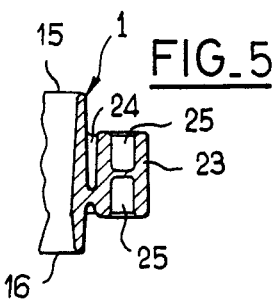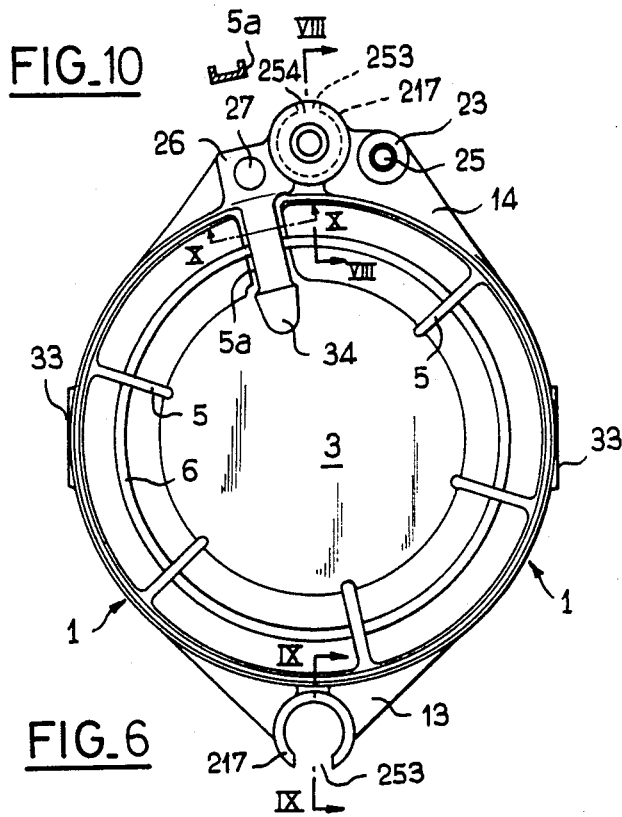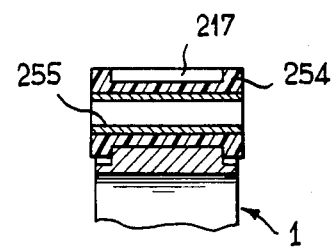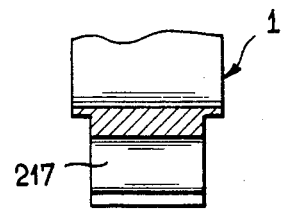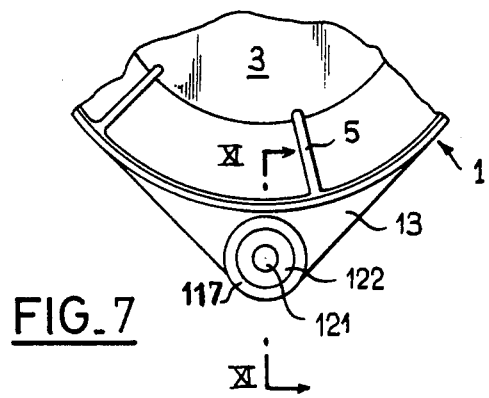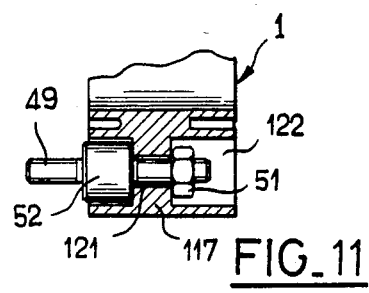

FLAT TYPE FAN, PARTICULARLY FOR ELECTRONIC CIRCUITS

This application is a continuation of application Ser. No. 363,432, filed 3/30/82.

BACKGROUND OF THE INVENTION

The present invention relates to a fan of the flat type, intended more especially for ventilating electronic circuits.

Fans of this kind, whose axial dimension is very much less than the radial dimension, generally comprise a casing forming a cylindrical duct and carrying in its central part, by means of arms, a support for a motor stator. Fan blades are integral with a rotor rotatably mounted on a shaft integral with the casing. Fixing to a wall is achieved by means of a square flange having holes at the corners for passing a screw there through.

It is important for the same type of fan to be able to be used for suction or blowing. To this end, it is provided with two flanges, one on each side. But such a construction leads to complication and a high manufacturing cost, requiring removal from the mould both in the radial and in the axial directions. There also results high material consumption, relatively high weight and large dimensions.

Efforts have been made to reduce these disadvantages by securing by means of two diamentrically opposite lugs situated in the facial planes of the casing. Thus economy in material is achieved, and at the same time manufacture is simplified, since removal from the mould is purely in the axial direction. But the same fan cannot be used both for suction and for blowing.

The present invention aims at providing a fan whose manufacture remains particularly economical both from the amount of material used and the operating simplicity and which, furthermore, may be used equally for blowing or for suction, while presenting a relatively reduced weight and taking up relatively less space.

SUMMARY OF THE INVENTION

According to the invention, the flat type fan, particularly for ventilating electronic circuits, comprises a casing forming a cylindrical duct and carrying in its central part a support for a motor stator, and this support is connected by arms to the periphery of the duct. This fan further comprises fan blades integral with a rotor rotatably mounted on a shaft integral with the casing, and the casing comprises means for fixing to a wall. The fan is characterised in that it comprises, on the periphery of the casing, two diametrically opposite fixing bosses each having there through at least one fixing passage parallel to the axis of the fan, the length of the bosses along the axis of the fan being substantially equal to the length of the box in the same direction.

With this construction, the flanges are suppressed which results in an appreciable gain in material and weight, and which reduces the radial dimension. Furthermore, manufacture is simplified since removal from the mould is purely in the axial direction. Finally, because of their length, the fixing bosses play the same role irrespective of the face of the fan which is applied against the wall. Thus the same fan may be used equally for blowing or for suction.

To ensure interchangeability of the fan with those of an older type, it is sufficient to give to the passages the same distance between axis as that of two diagonal holes of the square flanges.

According to an advantageous embodiment of the invention, each fixing boss has provided therethrough two parallel passages whose axis are in the same plane with the axis of the fan, which provides a possibility for adapting to boring standards.

According to a preferred embodiment of the invention, the fixing bosses are made integral with the case by means of a web disposed transversally to the axis of the fan, which forms a particularly light and economical fixing means.

One of the fixing webs of the bosses then carries advantageously an additional boss having a passage there through for receiving a ground connection.

The ground connection boss has preferably a length less than the axial length of the casing, so as to leave room for a screw head.

The web carrying the ground connection boss advantageously comprises a hole for fixing a collar for clamping supply wires, so that all the wiring relative to the fan ends in the same region.

The collar for clamping the wires advantageously comprises a flexible projection having a retaining notch for securing same by clipping into the hole of the web. One of the arms connecting the stator support to the cylindrical duct is hollowed out to form a gutter for housing the supply wires, and leading them up to the stator.

The fan preferably comprises a support block moulded on the supply wires, and the stator has a cavity for receiving this support block.

This support block comprises, at one of its ends, a stop for co-operating with the stator and limiting its distance of insertion in the cavity of the stator and, at its other end, a projection made from a flexible material having a retaining notch for preventing extraction of the support block introduced into the cavity of the stator.

The stripped ends of the wires are thus held perfectly immovable with respect to the fan, which facilitates connection thereof to the windings of the stator.

According to a preferred embodiment of the invention, the fan comprises a number of connecting arms between the stator support and the cylindrical duct sufficient to form a protection grid.

Since the number of arms is thus appreciably increased with respect to known constructions, it is possible to reduce their section, more especially in the axial direction, which allows the axial dimension of the fan to be reduced.

For further reducing the axial dimension of the fan, the fan blades have a single bearing comprising two bearing surfaces axially offset and separated by a cavity, the outer diameter of the bearing being reduced at the level of these bearing surfaces.

Thus an axial dimension is obtained very much less than that obtained by conventional mounting with two bearings separated by an oil felt.

BRIEF DESCRIPTION OF THE DRAWINGS

Other features and advantages of the invention will be better understood from the following detailed description.

In the accompanying drawings, given by way of a non-limiting example:

FIG. 1 is a view in axial section of a fan in accordance with the invention, along I—I of FIG. 2;

FIG. 2 is a cross-sectional view, from the arm side, along II—II of FIG. 1;

FIG. 3 is a view along III—III of FIG. 2;

FIG. 4 is a sectional view along IV—IV of FIG. 2;

FIG. 5 is a sectional view along V—V of FIG. 2;

FIG. 6 is a view similar to FIG. 2, according to another embodiment, the electric wires being removed;

FIG. 7 is a partial view, similar to FIG. 6, according to another embodiment;

FIG. 8 is a sectional view along VIII—VIII of FIG. 6;

FIG. 9 is a sectional view along IX—IX of FIG. 6;

FIG. 10 is a sectional view along X—X of FIG. 6;

FIG. 11 is a sectional view along XI—XI of FIG. 7;

FIG. 12 is a perspective view of the fixing collar for the wires;

DESCRIPTION OF THE PREFERRED EMBODIMENTS

Figure 13:
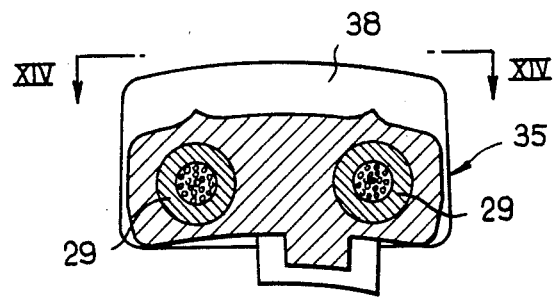
FIG. 13 is a sectional view of the support block for the wires, shown alone, along XIII—XIII of FIG. 1.

Referring to FIGS. 1 to 3, the fan comprises a casing 1 which forms a cylindrical duct 2 and carries, in its central part, a support 3 for the stator 4 of an electric motor. Support 3 is connected to the cylindrical duct 2 by arms 5 which are sufficient in number to form a protection grid. Distance pieces 6 connect these arms while forming a ring which serves both for strengthening and as an additional protection.

A shaft 7 housed in the centre of support 3 carries fan blades 8 through the bearing 9 housed in the hub 11 of the fan blade unit which contains the rotor 12 of the motor.

Two webs 13, 14 integrally formed with casing 1 are substantially diametrically opposite outside duct 2, the position of their plane relative to the faces 15, 16 of the case (FIG. 3) being dictated by moulding requirements.

A boss 17 is integral with these webs and the securing thereof to duct 2 is strengthened by a rib 18. The length of this boss is substantially equal to the axial length of case 1 (FIG. 4), and it has there through two parallel passages 19, 21 whose axis are substantially in the same plane with the axis of rotation of fan blade unit. At each of their ends, these passages open into a common chamber 22.

Web 14 carries an additional boss 23, the securing of which to duct 2 is strengthened by rib 24, and which is pierced with two symmetrical blind bores 25 in the extension of each other (FIG. 5), so as to form a closed passaged having an axis parallel to the axis of rotation of the fan.

The length of boss 23 is less than the distance separating the faces 15 and 16 of casing 1, so as to leave a space between it and the wall to which any one of these faces might be applied.

Web 14 further comprises, in a thicker portion 26, a bore 27 (FIG. 6) for receiving a collar 28 (FIGS. 2 and 3) in which are clamped the supply wires 29 for the motor.

Collar 28 (FIG. 12) comprises a projection made from a flexible material formed of three points 31 each having a retaining catch 32, so that it is efficient to push the points into bore 27 until the catches 32 come out on the other side of web 14 for the collar to be clipped into the web.

At about 90° on the bosses 17, casing 1 comprises two symmetrical lands 33 which facilitate handling thereof and lend themselves to inscriptions.

One of the connecting arms 5, reference 5a in FIGS. 2 and 6, is wider than the others and is formed with a gutter section (FIG. 10) for containing the supply wires 29 coming from collar 28. At the end of this arm, the stator support 3 has a bore there through 34 for allowing the wires through to the stator.

At the end of wires 29 going into the stator there is moulded a support block 35 (FIG. 1) which is housed in a cavity 36 of the stator, the ends 37 of the wires which come out from this block being stripped.

Figure 14:
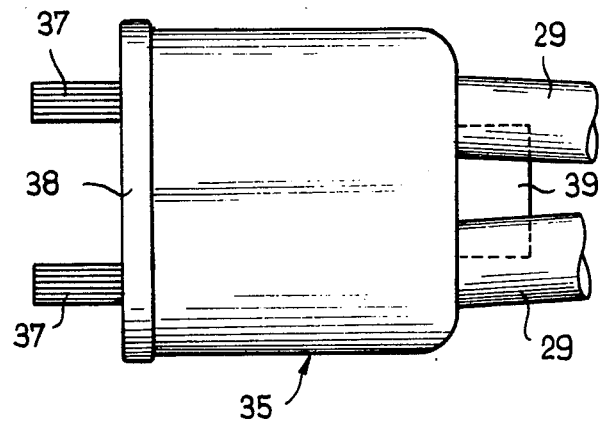
FIG. 14 is a view along XIV—XIV of FIG. 13.

Support block 35 comprises, on the sides of ends 37, a top 38 (FIGS. 13 and 14) for co-operating with a face of the stator and limiting its insertion into cavity 36. At its other end, it comprises a projection 39 made from a flexible material (FIG. 1) having a retaining catch 41 for co-operation with the other face of the stator and for preventing the support block 35 from being removed once introduced into cavity 36.

Bearing 9 integral with the fan blade unit 8 and rotatively mounted on shaft 7 comprises two bearing surfaces 42 (FIG. 1) separated by a central cavity 43 serving as an oil reserve. The ends 44 of the bearing situated at right angle to bearing surfaces 42 have reduced outer diameters. Thus, during force fitting of the bearing into the fan blade unit, deformation of the metal is not applied to the zone of the bearing surfaces and their coaxiallity is not affected.

Figure 15:
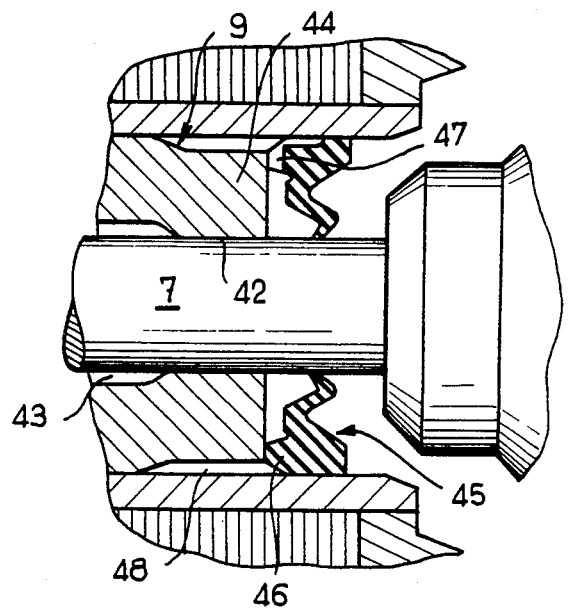
FIG. 15 is a enlarged view of a detail of a part of FIG. 1.

A washer 45 forming an oil seal is disposed about shaft 7 on the side of its embedded end. This washer comprises a peripheral flange 46 coming to bear on bearing 9. Radial indentations 47 are formed in this flange so as to cause the periphery of shaft 7 to communicate with cavity 48 formed between the fan blade unit 8 and part 44 of the bearing whose outer diameter is reduced (FIG. 15).

According to a further embodiment, casing 1 comprises securing bosses 117 (FIG. 7) where only a single passage 121 is formed. Fixing is then achieved by means of a threaded rod 49 associated with a knot 51, with a block of resilient material 52 occupying one of the chambers 122 (FIG. 11) and bearing on the shoulder formed at the end of this chamber.

In the above described embodiment, the presence of two passages 19,21 allows immediate adaptation to two standard distances between axes, and more especially allows this fan to be used as a replacement for a conventional fan having four securing points, by disposing the line of the bosses diagonally across the existing securing points.

According to a further embodiment, bosses 217 have a lateral opening 253 (FIGS. 6 to 9), so as to allow insertion of resilient protruding sleeve 254 (FIG. 8), into which is then inserted a rigid tube 255 for limiting crushing of sleeve 254 during tightening of the securing screw.

In this case, boss 217 properly speaking is of a length a little less than the axial length of casing 1, compensation being obtained by the protruding flange of sleeve 254.

In all cases, it is apparent, considering the symmetry of the securing bosses, that the fan may be fixed to a wall by any of its faces 15 or 16, i.e. either for blowing or for suction.

A ground wire 57 may also be fixed, by means of a screw 56 (FIG. 3), to boss 23, on any side, the head of the screw having room to be accomodated within the axial dimension of casing 1.

To fit the fan, with stator 4 installed, wires 29 are passed through cavity 36 of the stator until the support block 35 moulded thereover is introduced therein. This block is then pushed well in until it is clipped in place by projection 39. Then the stripped ends 37, thus held fixed, are soldered to the stator wires. Then wires 29 are brought back into the gutter of arm 5a and collar 28 is clipped into bore 27.

Then the fan blade unit 8 is engaged, by means of bearing 9, on shaft 2 after oil has been introduced into the central cavity 43 of the bearing. In operation, the oil which leaves the end of the bearing is projected by centrifugal force and, passing through the indentations 47 of washer 45, accumulates in cavity 48 where it is in contact with the bearing.

It is apparent that, by doing away with the conventional square flanges, considerable economy in material, a reduction in weight and a reduction in the radial dimension are achieved. And these advantages are in no way obtained to the detriment of the performances of the fan, which result essentially from the peripheral feed of the fan blade unit, so from the diameter thereof, which has in no ways been modified.

Besides these advantages in material, weight and radial size of this fan, with respect to conventional flange constructions, a reduction in the axial dimension is obtained more especially by increasing the number of connecting arms, which allows their section to be reduced, particularly in the axial direction. This advantage of the arms is added to that by which these arms dispense with the need, at least on one side of the apparatus, for the addition of a projection grid.

Although the dimension of arms 5 is reduced in the axial direction, the dimension of their section in the tangential direction is still further reduced, as shown in the cut-back 5b (FIG. 2), which confers on this arm an axial fin shape which serves as a honeycomb rectifier and improves the efficiency. The arms are in fact situated in the air output face. This role is completed by a similar shape for the distance pieces 6 (FIG. 1).

This reduction in the axial dimension is further the result of using a single bearing, which allows the length of the hub of the fan blade unit to be reduced. In all, the axial dimension may thus be reduced from 38 mm (1½") to 25.4 mm (1").

The fan according to the invention thus forms a novel industrial product forming a functional unit which complies with a single finality of economy, manufacture and use.

Of course, the invention is not limited to the examples described but covers any technological variation within the scope of a man skilled in the art.

What is claimed is:

1. In a flat type fan having a casing (1), a motor with a stator (4), a rotor (12) and a fan blade unit (8) integral with said rotor, said casing (1) being made from a moldable material and having a periphery constituted only by a cylindrical duct (2) and carrying in its central part a support (3) comprising a cavity adapted to receive the stator (4), said support being connected by radial arms (5, 5a) to the duct, the improvement comprising, on the periphery of the casing, two diametrically opposite fixing bosses (17) each having therethrough at least one fixing passage (19, 21) parallel to the axis of the cylindrical duct (2), said bosses (17) extending over the whole length of the cylindrical duct (2) defined by the casing along the axis of said duct, each of said fixing bosses (17) being integral with the casing through a single web (13 or 14) disposed perpendicularly to the axis of the fan, said web (14) carrying an additional boss (23) having therethrough a passage (25) parallel to the axis of the fan for receiving a ground connection (57), said web (14) comprising a hole (27) parallel to the axis of the fan for fixing a collar (28) for clamping supply wires (29), one (5a) of said arms connecting said support (3) to said duct (2) being adjacent to said web (14) comprising said hole (27) and being hollowed out to form a gutter serving as a housing for said supply wires (29), said gutter communicating with a hole (34) provided in said support (3).

2. A fan as claimed in claim 1, said single web (13 or 14) being disposed intermediate the axial length of said duct (2).

3. A fan as claimed in claim 2, said hole (27) and said gutter being disposed in the same plane that extends radially outwardly from said axis.

4. A fan as claimed in claim 1, said additional boss (23) being spaced from both ends of said duct (2).

5. A fan as claimed in claim 1, and a pair of ribs (18) parallel to said axis and each extending between and interconnecting one of said bosses (17) and said duct (2).

6. A fan as claimed in claim 1, wherein each fixing boss (17) has provided therethrough two parallel passages (19, 21) whose axes are parallel to the axis of said duct.

7. A fan as claimed in claim 1, wherein the ground connection boss (23) is of a length less than the length of said duct (2).

8. A fan as claimed in claim 6, wherein said collar (28) for clamping the wires (29) comprises a flexible projection (31) having a retaining catch (32) for securing thereof by clipping into the bore (27) of said web (14).

9. A fan as claimed in claim 1, wherein said arms connecting said stator support to said circular duct are connected together by distance pieces.

* * * * *